April 22, 1952 — H. C. JOHANSEN — 2,594,028
CHUCK MECHANISM
Filed Jan. 4, 1945 — 3 Sheets-Sheet 1

Inventor:
Harry C. Johansen.
by
Louis A. Maxson.
Atty.

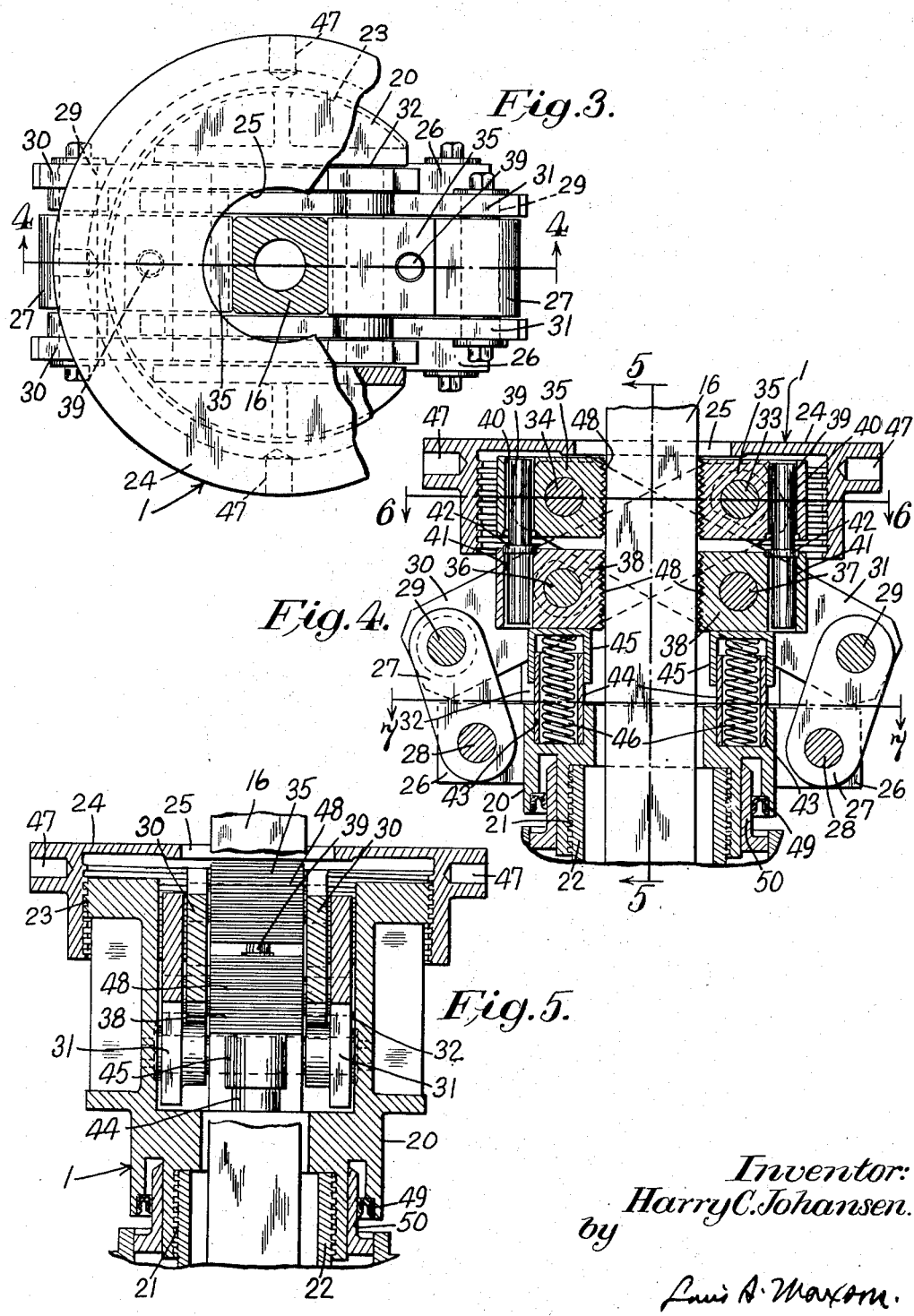

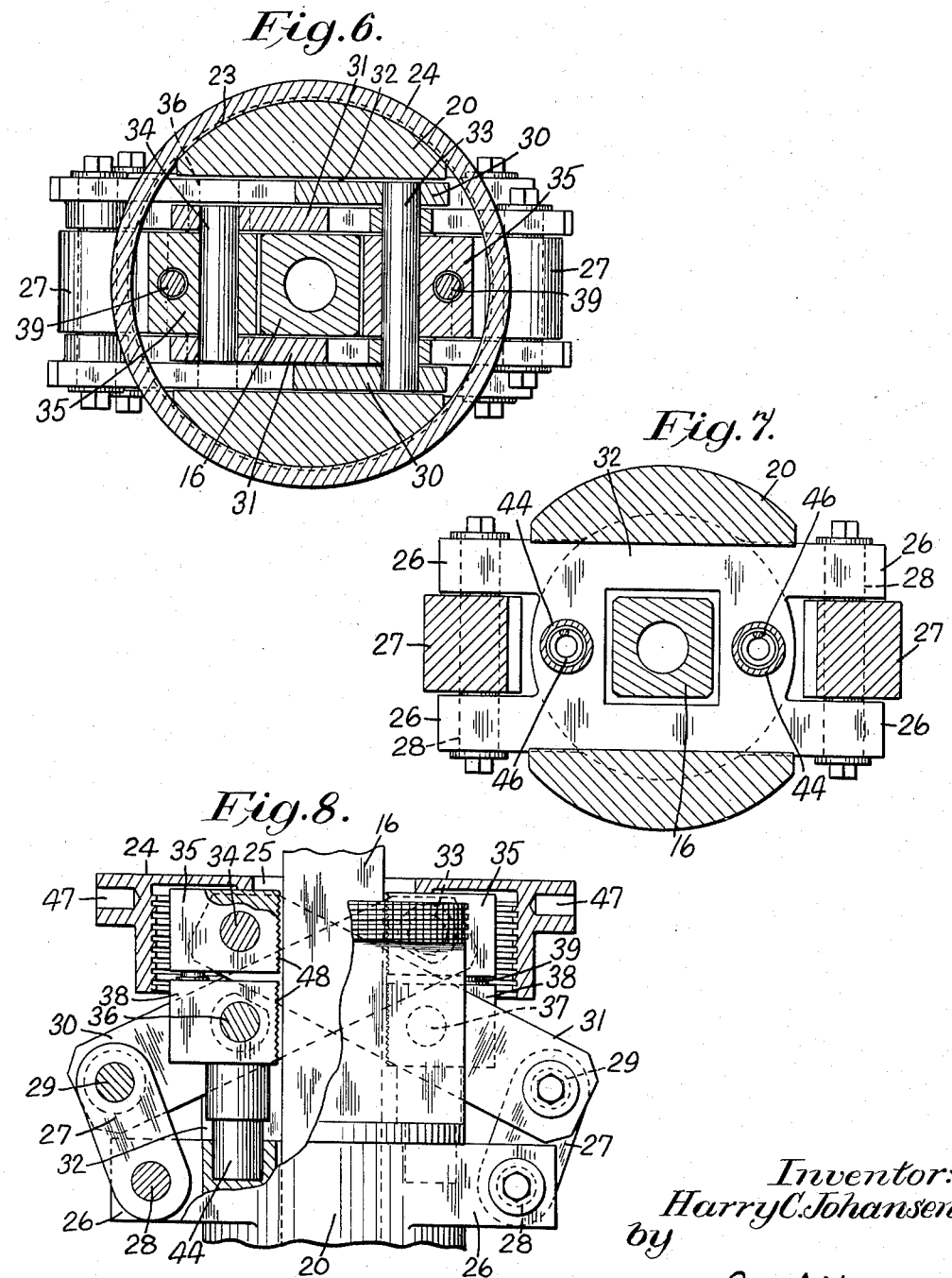

Patented Apr. 22, 1952

2,594,028

UNITED STATES PATENT OFFICE 2,594,028

CHUCK MECHANISM

Harry C. Johansen, Michigan City, Ind., assignor to Joy Manufacturing Company, a corporation of Pennsylvania Application January 4, 1945, Serial No. 571,235

15 Claims. (Cl. 24—249)

This invention relates to chuck mechanisms and more particularly, but not exclusively, to an improved automatic chuck mechanism especially designed for use with rotary drilling apparatus.

An object of the present invention is to provide an improved chuck mechanism. Another object is to provide an improved automatic chuck mechanism adapted to move automatically into gripping position upon bodily movement in one direction relative to the article to be gripped and to move automatically into released position upon bodily movement in the opposite direction relative to such article. A further object is to provide an improved chuck mechanism having improved operating means. A still further object is to provide an improved automatic chuck mechanism associated with the feeding means of a rotary drilling apparatus and having improved operating means, whereby, upon feeding movement in one direction, the chuck mechanism is automatically applied, and, upon feeding movement in the opposite direction, the chuck mechanism is automatically released. Yet another object is to provide an improved chuck mechanism embodying movable chuck jaws and having improved supporting and operating means for the chuck jaws. Still another object is to provide an improved automatic chuck mechanism having improved means for manually moving and holding the chuck jaws out of gripping position. These and other objects and advantages of the invention will, however, hereinafter more fully appear.

In the accompanying drawings there is shown for purposes of illustration one form which the invention may assume in practice.

In these drawings:

Fig. 3 is an enlarged horizontal sectional view taken substantially on line 3—3 of Fig. 1, with parts broken away.

Fig. 4 is a vertical sectional view taken substantially on line 4—4 of Fig. 3, showing the chuck jaws in gripping position.

Fig. 5 is a vertical sectional view taken substantially on line 5—5 of Fig. 4.

Fig. 6 is a horizontal sectional view taken substantially on line 6—6 of Fig. 4.

Fig. 7 is a horizontal sectional view taken substantially on line 7—7 of Fig. 4.

Fig. 8 is a sectional view similar to Fig. 4, with parts in elevation, showing the chuck jaws in manually released position.

Figure 1:
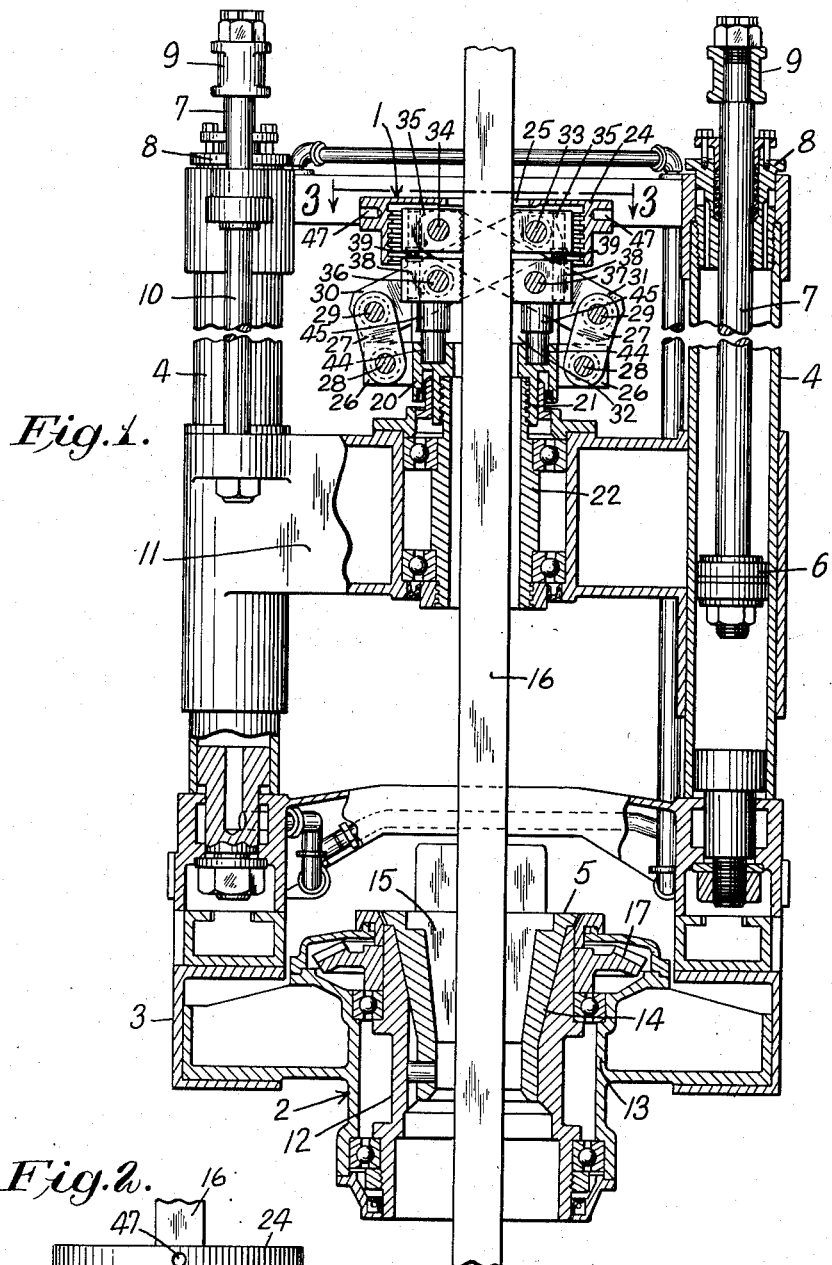
Fig. 1 is a view in vertical section, with parts in side elevation, taken through a rotary drilling apparatus with which the improved chuck mechanism is associated and showing the chuck structure in detail.
Figure 2:
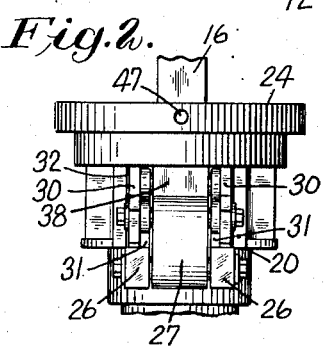
Fig. 2 is a fragmentary side elevational view of the chuck mechanism shown in Fig. 1.

In this illustrative embodiment of the invention, the improved automatic chuck mechanism, generally designated 1, is shown associated with a rotary drilling apparatus, generally designated 2, which, for purposes of illustration, may be of the same general character as that disclosed in the H. H. Vanderzee Patent No. 2,309,999, granted February 2, 1943. It will be evident, however, that the improved chuck mechanism may be associated with various other types of apparatus.

The drilling apparatus 2 comprises a supporting frame structure 3 having mounted thereon parallel upright hydraulic feed cylinders 4, 4, and a rotary table 5 is arranged between the feed cylinders near their lower ends. The feed cylinders contain reciprocable feed pistons 6 having their piston rods 7 extending upwardly through the top packed heads 8 of the cylinders. The piston rods are secured at their upper ends to cross yokes 9, and connecting rods 10 extending longitudinally along the sides of the feed cylinders connect these cross yokes to a crosshead 11, the latter extending between and slidably guided on the feed cylinders. This sliding crosshead carries the automatic chuck mechanism 1, as will later be explained. The rotary table 5 comprises a rotary member 12 journaled within bearings supported within a casing 13 carried by the frame structure 3, and the rotary member 12 has a bushing 14 which receives slips 15 engageable with a conventional drill stem or kelly 16. This drill stem is preferably square in cross section, although it may obviously assume various other shapes, and the slips 15 are engageable with the flat sides of the stem so that the latter may be rotated by the table as it moves axially through the table opening. The table is driven by a bevel gear 17. Upon movement of the feed pistons 6 within the feed cylinders in a direction to feed the drill stem toward the work, the chuck mechanism 1, whose details will shortly be described, acts automatically to grip the drill stem, and, upon reverse movement of the feed pistons within the feed cylinders, the chuck mechanism is automatically released. When the chuck mechanism is released and moved upwardly, the drill stem may be held against downward movement through the table either by the slips of the table or by the cable of a conventional drill hoisting mechanism attached in a well-known manner to the upper end of the drill stem.

Now referring more specifically to the improved automatic chuck mechanism 1, it will be noted that a chuck casing 20 is mounted on the top of the sliding crosshead 11 between the feed cylinders, in the manner shown in Fig. 1, and is secured at 21 to a sleeve 22, the latter being journaled within suitable thrust bearings supported within the crosshead. The drill stem 16 passes centrally through this sleeve and through the chuck mechanism in the manner shown. Threadedly secured at 23 to the top of the chuck casing 20 is a rotatable member 24 having a center opening 25 for receiving the drill stem, and this member provides a closure at the top of the chuck casing. Disposed at diametrically opposite sides of the chuck casing are lateral ears 26 between which are arranged links 27 pivotally mounted at their lower ends on pins 28 which are supported by the casing ears 26. The upper ends of the links 27 are pivotally connected by pins 29 to the lower ends of pairs of parallel crossed links 30 and 31 herein arranged within a transverse chamber 32 in the chuck casing. The upper ends of the pairs of crossed links 30 and 31 are free to move a limited distance in a vertical direction relative to the casing when the member 24 is not screwed down by means of the threaded connection 23. The pair of parallel links 30 are arranged outside the parallel links 31, and the pairs of links 30, 31 have pivotally connected thereto at their upper ends by pivot pins 33 and 34 respectively upper chuck jaws 35, and the pairs of links have pivotally connected thereto intermediate their ends by pivot pins 36 and 37 lower chuck jaws 38. The pairs of chuck jaws 35, 38 at each side of the casing are held in line with each other by means of vertical guide pins 39 having a sliding fit with openings 40 and 41 in the jaws. These guide pins have collars 42 which rest on surfaces formed on the lower jaws 38 in the manner shown. Fitted within bores 43 within the lower portion of the chuck casing are sleeves 44 on which sleevelike plungers 45 are guided, and, arranged within the sleeves 44 and engaging the plungers 45, are coil springs 46 for constantly urging the plungers upwardly into engagement with the lower surfaces of the lower jaws 38. These spring pressed plungers exert an upward pressure on the chuck jaws to hold the latter in contact with the drill stem when the chuck mechanism is in operation. The rotatable member 24 has spaced radial openings 47 about its periphery for receiving a suitable turning bar, whereby the member 24 may be screwed downwardly with respect to the chuck casing into engagement with the upper surfaces of the upper jaws 35 for moving the chuck jaws from their gripping position, shown in Fig. 4, to their released non-gripping position, shown in Fig. 8, and for holding them released. The pivoted links 27 provide a "floating" pivotal mounting for the lower ends of the pairs of crossed links 30, 31 to permit the chuck jaws to move bodily into and out of gripping engagement with the drill stem, with the guide pins 39 maintaining the upper and lower jaws in alinement during such in and out movement. The inner surfaces of the chuck jaws 35, 38 are serrated at 48 to afford adequate gripping of the drill stem. A dirt seal 49 is arranged between the chuck casing and a sleeve 50 carried by the sliding crosshead 11 for preventing access of dirt to the thrust bearings for the sleeve 22.

The general mode of operation of the improved chuck mechanism is as follows: When the parts are in the position shown in Figs. 1 and 4 with the chuck jaws in gripping position and liquid under pressure is supplied to the upper ends of the feed cylinders 4, the feed pistons 6 are moved downwardly, thereby to move the crosshead 11 downwardly along the feed cylinders, and the chuck jaws at that time are caused automatically to grip the drill stem or kelly 16, due to the powerful lever action, to effect feed of the drill stem through the rotary table 5. As the drill stem slides axially through the table bushing 14, it is rotated in a well-known manner by the slips 15 of the table 5. When liquid under pressure is supplied to the lower ends of the feed cylinders, the feed pistons are moved upwardly, thereby moving the crosshead 11 upwardly along the cylinders, and, when the drill stem is adequately held against movement by the table slips or the cable of the hoisting mechanism, or even by its own weight, the chuck jaws are automatically released against the pressure exerted by the spring pressed plungers 45. When the feed pistons have been returned to the tops of the cylinders and it is again desired to feed the drill stem downwardly through the rotary table, liquid under pressure is again supplied to the upper ends of the cylinders, thereby to cause the feed pistons to move downwardly, and as the crosshead is moved downwardly along the cylinders, the chuck jaws automatically grip the drill stem to effect feed of the latter through the rotary table. As the chuck mechanism is moved bodily downwardly by the feeding means, the frictional contact of the jaws with the drill stem causes the links to swing upwardly a slight distance, while at the same time, the lower ends of the links move inwardly, and, as a result, the chuck jaws move into tight gripping contact with the drill stem. Conversely, when the chuck mechanism is moved bodily upwardly by the feeding means, the links swing downwardly and outwardly causing the jaws to move apart out of gripping position. The chuck jaws may be manually released at will simply by turning the rotatable member 24 to move the chuck jaws downwardly from their gripping position, shown in Fig. 4, to their released position, shown in Fig. 8, against the pressure exerted by the spring pressed plungers. It may thus be noted that the pairs of crossed links provide a flexible pivotal mounting for the chuck jaws so that the chuck jaws are moved into gripping relation with the drill stem with a powerful leverage action, and, similarly, the chuck jaws may be readily released from their gripping position. As the pairs of crossed links are swung to effect movement of the chuck jaws, the floating link mountings at the lower ends of the links permit bodily movement of the jaws into and out of their gripping position, and the vertical guide pins maintain the pairs of upper and lower jaws in alinement during such movement.

As a result of this invention, it will be noted that an improved automatic chuck mechanism is provided which is automatically applied upon bodily movement in one direction and automatically released upon bodily movement in the opposite direction. It will further be evident that, by the provision of the improved supporting structure for the chuck jaws and the particular jaw operating means, the chuck jaws effectually grip the drill stem with a powerful leverage action and may be readily released as desired. By the provision of the improved manual operating means for the chuck jaws, the latter may be readily moved into their released non-gripping position and so held. Other modes of use and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a chuck mechanism, a chuck casing through which a member to be gripped is adapted to extend and movable bodily in a direction axially of the member, a link pivotally mounted on said casing, a second link pivotally connected at one end to said link and having its other end relatively free, and said first link permitting pivotal and bodily movements of said second link relative to said casing, relatively movable chuck jaws carried by said second link and respectively arranged at opposite sides of the member to be gripped, and resilient means tending to swing and bodily move said second link in one direction relative to said casing to hold yieldingly said jaws in light frictional contact with the member to be gripped, said jaws when so held in light frictional contact with the member to be gripped and said casing as it is moved bodily axially relative to the member causing said second link to move pivotally and bodily to effect movement of said jaws inwardly into firm gripping engagement with the member thereby to connect the latter to said casing for bodily axial movement therewith.

2. In a chuck mechanism, a chuck casing through which a member to be gripped is adapted to extend and movable bodily in a direction axially of the member, a link pivotally mounted on said casing, a second link pivotally connected at one end to said link and having its other end relatively free, and said first link permitting pivotal and bodily movements of said second link relative to said casing, relatively movable chuck jaws carried by said second link and respectively arranged at opposite sides of the member to be gripped, resilient means tending to swing and bodily move said second link in one direction relative to said casing to hold yieldingly said jaws in light frictional contact with the member to be gripped, said jaws when so held in light frictional contact with the member to be gripped and said casing as it is moved bodily axially relative to the member causing said second link to move pivotally and bodily to effect movement of said jaws inwardly into firm gripping engagement with the member thereby to connect the latter to said casing for bodily axial movement therewith, and means for swinging and bodily moving said second link in the opposite direction relative to said casing against the action of said resilient means to effect outward release of said jaws from the member gripped thereby, said first link permitting such bodily movement of said second link to permit jaw release upon such swinging of said second link in said opposite direction.

3. In a chuck mechanism, a chuck casing through which a member to be gripped is adapted to extend, a pair of crossed links pivotally mounted on said casing at opposite sides thereof and extending in opposite directions and crossing at a plane which includes the longitudinal center line of said casing, a pair of chuck jaws carried by each of said links at opposite sides of the member to be gripped, guiding means engaging said pairs of jaws for maintaining the latter in proper position to grip the member as said links are swung about their pivots, and means for swinging said links in one direction about their pivots to move said pairs of jaws inwardly toward each other into gripping relation with the member to be gripped.

4. In a chuck mechanism, a chuck casing through which a member to be gripped is adapted to extend, a pair of crossed links, means at opposite sides of said casing providing floating pivotal mountings for one end of said links, said links extending in opposite directions and crossing at a plane which includes the longitudinal center line of said casing with their opposite ends relatively free, a pair of relatively movable chuck jaws carried by each of said crossed links at opposite sides of the member to be gripped, guiding means engaging said pairs of jaws for maintaining the latter in proper position to grip the member to be gripped as said links are swung on their pivotal mountings, and means for swinging said links in one direction about their pivots relative to said casing to move said pairs of jaws inwardly toward each other in gripping relation with the member to be gripped, and said floating pivotal mountings for said links permitting bodily movement of the latter relative to said casing during swinging of said links to permit proper gripping engagement of said jaws with the member to be gripped.

5. In a chuck mechanism, a chuck casing through which a member to be gripped is adapted to extend, a pair of crossed links pivotally mounted at the opposite sides of said casing and extending in opposite directions and crossing at a plane which includes the longitudinal center line of said casing, a pair of relatively movable chuck jaws carried by each link at opposite sides of the member to be gripped, and said pairs of jaws moving inwardly toward gripping position upon swinging of said links about their pivots, guiding means engaging said jaws for maintaining the latter in proper position to grip the member to be gripped as said links are swung, and spring means for swinging said links in one direction about their pivots to hold yieldingly said jaws inwardly in contact with the member to be gripped.

6. In a chuck mechanism, a chuck casing through which a member to be gripped is adapted to extend, a pair of crossed links pivotally mounted at the opposite sides of said casing and extending in opposite directions and crossing at a plane which includes the longitudinal center line of said casing, a pair of relatively movable chuck jaws carried by each link at opposite sides of the member to be gripped, and said pairs of jaws moving inwardly toward gripping position upon swinging of said links about their pivots, guiding means engaging said pairs of jaws for maintaining the latter in proper position to grip the member to be gripped as said links are swung, and spring means for swinging said links in one direction about their pivots to hold yieldingly said jaws inwardly in contact with the member to be gripped, said links being swingable about their pivots in the opposite direction against the action of said spring means to move said jaws outwardly from gripping engagement with the member.

7. In a chuck mechanism, a chuck casing through which a member to be gripped is adapted to extend, a link pivotally mounted at one side of said casing and extending toward the opposite side of said casing, a pair of relatively movable chuck jaws having pivotal connection with said link at opposite sides of the member to be gripped, said link selectively swingable in one direction about its pivot relative to said casing to move said jaws inwardly toward each other to grip the member and in the opposite direction to move said jaws apart out of engagement with the member, and guiding means engaging said jaws and extending in a direction lengthwise of the member to be gripped for maintaining said jaws in proper gripping position parallel to a common straight line during movement thereof into and out of gripping relation with the member.

8. In a chuck mechanism, a chuck casing through which a member to be gripped is adapted to extend, a pair of crossed links pivotally mounted on said casing at the opposite sides thereof and having their outer ends relatively free, a pair of relatively movable chuck jaws pivotally connected to each link at opposite sides of the member to be gripped, there being two upper and lower jaws at each side of the casing, said links being swingable to move said jaws into and out of gripping position, and guiding means engaging the two jaws at each side of said casing for maintaining the same in vertical alignment in proper position to grip the member during such movement thereof.

9. In a chuck mechanism, a chuck casing through which a member to be gripped is adapted to extend, a link pivotally mounted on said casing at one side thereof and extending across said casing, a pair of relatively movable chuck jaws having pivotal connection with said link at opposite sides of the member to be gripped, said link selectively swingable at its pivot in one direction to move said jaws inwardly toward each other to grip the member to be gripped and in the opposite direction to move said jaws apart out of engagement with the member, means engaging said jaws for guiding the latter to prevent rocking thereof to maintain said jaws in proper position to grip the member as said link is swung, and spring means engaging one of said jaws for constantly tending to swing said link in one direction, and said link swingable in the opposite direction against the action of said spring means.

10. In a chuck mechanism, a chuck casing through which a member to be gripped is adapted to extend, a link having a loose pivotal connection at one end with said casing at one side of the latter and extending across the casing with its other end relatively free, said loose pivotal connection permitting bodily movement of said link as the latter is swung about its pivot, a pair of jaws having pivotal connection with said link at opposite sides of the member to be gripped, said link swingable and bodily movable in opposite directions to permit said jaws to move inwardly toward each other into gripping position and to move outwardly apart out of gripping position, guiding means engaging said jaws for preventing rocking thereof to maintain said jaws in proper position to grip the member to be gripped during aforesaid movements thereof, and manually operable means on said casing and acting on the free end of said link for swinging the latter about its pivot in a direction to move said jaws apart out of gripping position to effect release thereof from the member gripped thereby.

11. In a chuck mechanism, a chuck casing through which a member to be gripped is adapted to extend, a pair of crossed links pivotally mounted on said casing at opposite sides thereof and extending in opposite directions across a plane which includes the longitudinal center line of the casing, a pair of chuck jaws carried by each link with a pair of jaws at each side of the member to be gripped, said links swingable in one direction to move said pairs of jaws towards each other into gripping position and in the opposite direction to move said pairs of jaws apart out of gripping position, guiding means engaging said pairs of jaws for maintaining the latter in proper position to grip the member as said links are swung as aforesaid, and manually operable means on said casing for swinging said links in one direction to move said pairs of jaws apart out of their gripping position.

12. In a chuck mechanism, a chuck casing through which a member to be gripped is adapted to extend, a pair of crossed links pivotally mounted on said casing at opposite sides thereof and extending in opposite directions across said casing and crossing at a plane which includes the longitudinal center line of said casing, a pair of relatively movable chuck jaws carried by each link with a pair of jaws at each side of the member to be gripped, guiding means engaging said pairs of jaws for maintaining the latter in proper position to grip the member, constantly acting means tending to swing said links in one direction to move said pairs of jaws inwardly toward each other into gripping position, and manually operable means on said casing for swinging said links in the opposite direction against the action of said constantly acting means to move said pairs of jaws apart out of gripping position.

13. In a drill stem chuck mechanism, a casing through which a drill stem is adapted to extend and movable bodily in a direction axially of the drill stem, pairs of chuck jaws arranged in said casing with the jaws of each pair disposed at opposite sides of the stem, floating pivotal mountings for said jaws on said casing at its opposite sides including crossed links having pivotal and bodily movements relative to said casing, said links extending in opposite directions across a plane which includes the longitudinal center line of the casing and each link carrying a pair of jaws, guiding means engaging a pair of jaws at each side of the drill stem for maintaining said jaws in proper position to grip the stem, and resilient means for swinging said links of said mountings in relatively opposite directions to move said jaws inwardly and yieldingly to hold said jaws in light frictional contact with the stem, said jaws when so positioned and upon bodily movement of said casing relative to the stem causing said links to swing about their pivots to move said jaws into firm gripping engagement with the stem.

14. In a drill stem chuck mechanism, a casing through which a drill stem is adapted to extend and movable bodily axially relative to the stem, pairs of upper and lower chuck jaws in said casing, a pair disposed at each side of the stem, floating pivotal mountings for said jaws at the opposite sides of said casing including a pair of crossed links having pivotal and bodily movements relative to said casing, said links extending in opposite directions across a plane which includes the longitudinal center line of said casing and each link carrying an upper jaw and a lower jaw, guiding means engaging said upper and lower jaws for maintaining the same in proper position to grip the stem, and resilient means acting on the lower jaws to move said links both pivotally and bodily to cause said jaws yieldingly to engage the stem with a relatively light frictional contact, said jaws when so positioned and as said casing is moved bodily axially of the stem causing said links to swing and move bodily to move said jaws into firm gripping engagement with the stem.

15. In a drill stem chuck mechanism, a casing through which a drill stem is adapted to extend and movable bodily axially relative to the stem, pairs of upper and lower chuck jaws in said casing, a pair disposed at each side of the stem, floating pivotal mountings for said jaws at the opposite sides of said casing including a pair of crossed links having pivotal and bodily movements relative to said casing, said links extending in opposite directions across a plane which includes the longitudinal center line of said casing and each link carrying an upper jaw and a lower jaw, guiding means engaging said upper and lower jaws for maintaining the same in proper position to grip the stem, resilient means acting on the lower jaws to move said links to cause said jaws yieldingly to engage the stem with a relatively light frictional contact, said jaws when in such light frictional contact with the stem and as said casing is moved bodily axially of the stem causing said links to swing thereby to move said jaws into firm gripping engagement with the stem, and adjustable means on said casing and acting on the upper jaws to move said links for releasing all of said jaws from the stem in opposition to said resilient means.

HARRY C. JOHANSEN.

REFERENCES CITED

The following references are of record in the file of this patent:

UNITED STATES PATENTS

| Number | Name | Date |
| --- | --- | --- |
| 146,869 | Bucklin | Jan. 27, 1874 |
| 605,855 | Colborne | June 21, 1898 |
| 673,605 | Jacques | May 7, 1901 |
| 675,047 | MacGarvey et al. | May 28, 1901 |
| 821,645 | Johnson | May 29, 1906 |
| 998,248 | Jahn | July 18, 1911 |
| 1,049,725 | Johnson | Jan. 7, 1913 |
| 1,149,034 | Despain | Aug. 3, 1915 |
| 1,726,521 | Davis | Aug. 27, 1929 |
| 2,310,960 | Johansen | Feb. 16, 1943 |